United States Patent [19]

Rabinow

[11] Patent Number: 4,531,061
[45] Date of Patent: Jul. 23, 1985

[54] ELECTRICALLY SETTABLE ESCORT MEMORY

[76] Inventor: Jacob Rabinow, Bethesda, Md. 20817

[21] Appl. No.: 394,206

[22] Filed: Jul. 1, 1982

[51] Int. Cl.³ ............................................. G06K 7/10
[52] U.S. Cl. ................................. 250/566; 250/223 R
[58] Field of Search ..................... 350/331 R, 333; 250/555, 566, 568, 223 R; 235/383, 385, 462, 467

[56] References Cited

U.S. PATENT DOCUMENTS

| | | |
|---|---|---|
| 2,901,089 | 8/1959 | Rabinow et al. . |
| 2,961,093 | 11/1960 | Rabinow . |
| 3,080,985 | 3/1963 | Rabinow et al. . |
| 3,277,283 | 10/1966 | Rabinow et al. . |
| 3,304,412 | 2/1967 | Rabinow . |
| 3,309,711 | 3/1967 | Sorrells et al. . |
| 3,538,338 | 11/1970 | Rabinow ................. 250/223 R |
| 3,662,181 | 5/1972 | Hercher et al. ............ 250/223 R |
| 3,739,181 | 6/1973 | Vincent, Jr. et al. ......... 250/223 R |
| 3,784,795 | 1/1974 | Tuhro . |
| 3,993,193 | 11/1976 | Welch et al. ................ 250/555 |
| 4,022,340 | 5/1977 | D'Aloia .................... 214/307 |
| 4,194,126 | 3/1980 | Rabinow ................... 250/566 |
| 4,248,503 | 2/1981 | Huguenin .................. 350/357 |
| 4,432,610 | 2/1984 | Kobayashi et al. ......... 350/331 R |

Primary Examiner—David C. Nelms
Assistant Examiner—J. Gatto
Attorney, Agent, or Firm—William D. Hall

[57] ABSTRACT

This invention describes a code system using a plurality of liquid crystal and other optical codes particularly suited to sorting conveyors. The codes are preferably (but not necessarily) of the binary type and form a set of indicia to accompany each article to be sorted. The code can be set and reset remotely either by a beam of light or by other non-mechanical means. Recognition of a particular code is detected by an optical detector.

14 Claims, 12 Drawing Figures

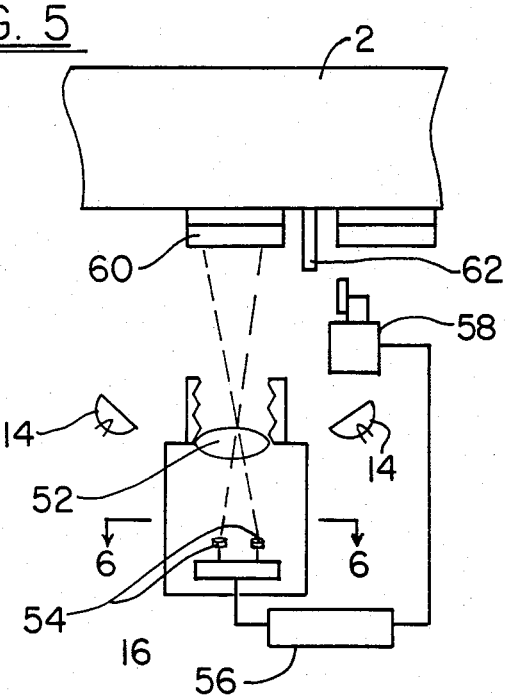
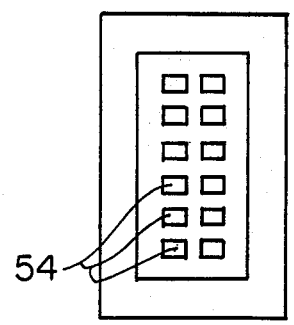
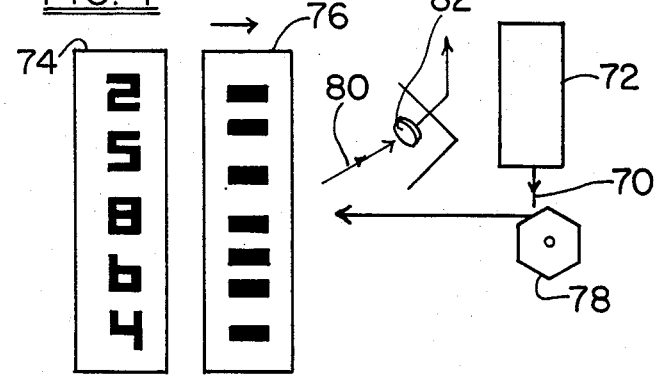
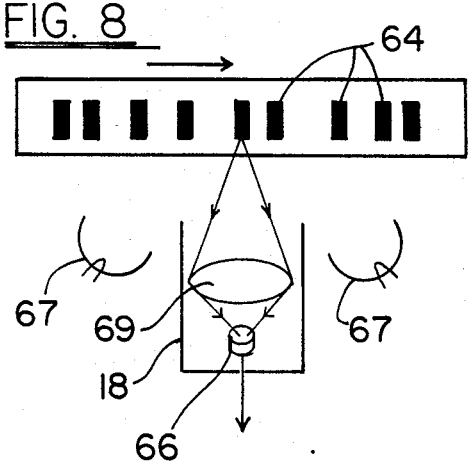
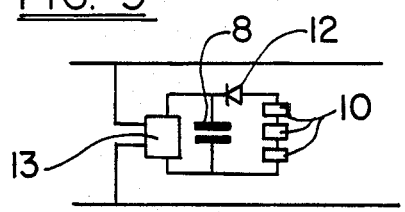
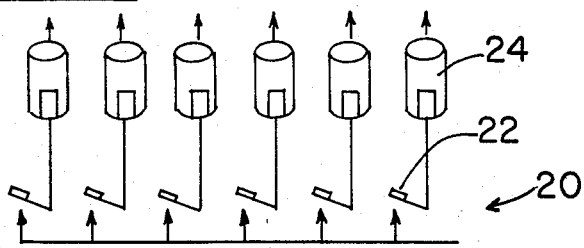
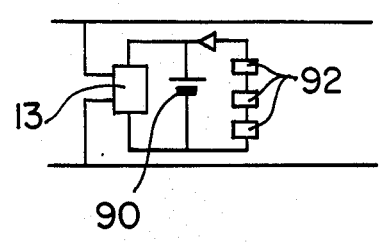
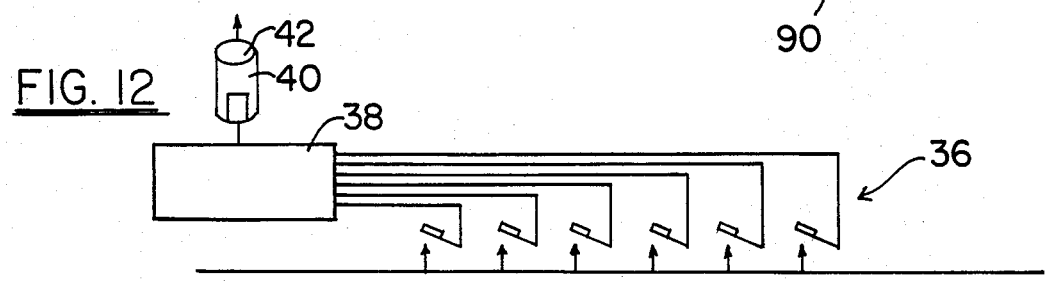

ELECTRICALLY SETTABLE ESCORT MEMORY

BACKGROUND OF THE INVENTION

Reference is made to sorting systems where the code is attached to an object and by which the object can be identified as it moves past an inspection station. For example, railroad car identifying patents such as U.S. Pat. Nos. 3,277,283 and 3,304,412 show optically read "labels" that enables a freight car to be identified as it moves. U.S. Pat. No. 3,739,181 shows an arrangement for coding objects where tabs carrying coded messages are magnetized in a special manner and the magnetic codes can be detected by suitable devices. These magnetic tabs act as an escort memory for the objects being transported.

U.S. Pat. No. 3,784,795 shows a label to be attached to packages where said label is then read by optical means. U.S. Pat. No. 3,309,771 describes a magnetic stripe that can be printed on an envelope or on other pieces of mail and which can be read by a magnetic pickup head as a piece of mail passes it. U.S. Pat. No. 3,662,181 describes a bar code which is printed on an object and which can be optically detected and read as an object moves past a detection station.

A very widely used coding scheme is the Universal Product Code, more familiarly known as the UPC code, which can be seen on objects such as those in a grocery store. The codes are read by a laser scanner at the checkout counters. Such bar codes are now becoming widely used on such things as magazine covers and many other objects which have to be checked or sorted sometime during their life time. Please note that in the systems mentioned so far the code is either attached to an object or is part of the object itself and is not easily changed in transit as is required in a system such as for letter sorting. When it is desired to change a code "on the fly" and not attach the code to the object itself, such as in the case of letters or postal cards, escort memories have been resorted to. U.S. Pat. No. 2,961,093 was issued to me in connection with the sortation of punch cards. Here, a binary code, consisting of settable cams, carries the information along with each card. The cams can be easily set and reset as described in the patent.

Coming closer to the matter of this patent application, note particularly conveyors such as used for letter mail described, for example, in U.S. Pat. No. 2,901,089 issued to Lawrence J. Kamm and to me dated Aug. 25, 1959. See also U.S. Pat. No. 3,538,338, issued to me on Nov. 3, 1970, which shows another type of optical escort memory, and my U.S. Pat. No. 4,194,126 on still another escort memory. Reference is also made to U.S. Pat. No. 3,080,985, which shows a method for setting the code wheels of the above-mentioned U.S. Pat. No. 2,901,089. An additional patent of interest may be U.S. Pat. No. 4,022,340, issued to Andrew E'Aloia on May 10, 1977, which shows a modification of the letter carrier system first disclosed in my U.S. Pat. No. 2,901,089.

Escort memories may be of many types—mechanical memories, such as shown in the referenced patents referred to above; optical memory, such as shown in U.S. Pat. No. 3,358,338, mentioned above; magnetic recordings either carried by the conveyor belt or by members attached thereto; and so on.

The present invention is intended to overcome many of the problems experienced by prior art devices. The device of Patent '089 issued to Lawrence Kamm and myself describes a code memory in widespread use today in the United States Post Offices. The mechanical code wheels produce a great deal of noise and require a considerable amount of servicing. Moreover, the mechanism to set and reset the codes is quite elaborate and is also subject to a considerable number of mechanical problems. U.S. Pat. No. 3,538,338 shows an optical memory which does not produce noise but which requires mechanical setting and resetting the codes and recognition of the code by the code detector. With the normal operation of conveyor belts such as used in Post Offices, the mechanical tolerances become very difficult and damage to the optical components can easily occur.

U.S. Pat. No. 4,194,126 shows another optical memory consisting of a series of mirrors. This invention avoids some of the problems enumerated above but still requires mechanical setting and resetting of the mirrors with attendant wear and requirement of high precision in the position of the mirrors.

SUMMARY

The present invention requires no mechanical setting of the escort memory code and no mechanical recognition. In its simplest form, it can consist of an electrically controlled bar code consisting of liquid crystal displays and optical recognition circuitry. The liquid crystal displays can be of any suitable form, such as vertical or horizontal bars, in any desired configurations such as binary codes, numeric displays, or more sophisticated displays which can be recognized by proper optical detectors in any possible orientation. Bar codes are, of course, very old. A very familiar one now is the bar code used on products such as grocery goods and which is examined by a laser scanner which crisscrosses the bar code and "reads" it in any orientation. It is known as the UPC (Universal Product Code)code.

To explain my invention, I shall describe the application of a liquid crystal bar code display such as can be used on a conveyor belt of the type disclosed in U.S. Pat. No. 2,901,089. The liquid crystal display can be set by an electronic circuit which, in turn, receives its signal from one or more photocells mounted on the conveyor. The photocells are energized by an external encoding device at the time an object, such as a letter, is fed into the conveyor. The code is recognized by an optical detector when a letter reaches its proper destination as the conveyor moves.

BRIEF DESCRIPTIONS OF THE DRAWINGS

FIG. 5 shows a top view of a code examining station.

FIG. 6 shows a sectional side view of the device of FIG. 5 taken along line 6—6.

FIG. 7 shows a schematic arrangement for scanning a code array by a flying spot scanner.

FIG. 8 shows a single photocell pickup device for scanning a moving array of the bar codes.

FIG. 9 shows the circuit for charging an energy storing capacitor.

FIG. 10 shows the circuit for charging a battery power supply.

FIG. 11 shows a simple keyboard code setting device.

FIG. 12 show another code setting scheme.

DESCRIPTION OF THE INVENTION

Figure 1:
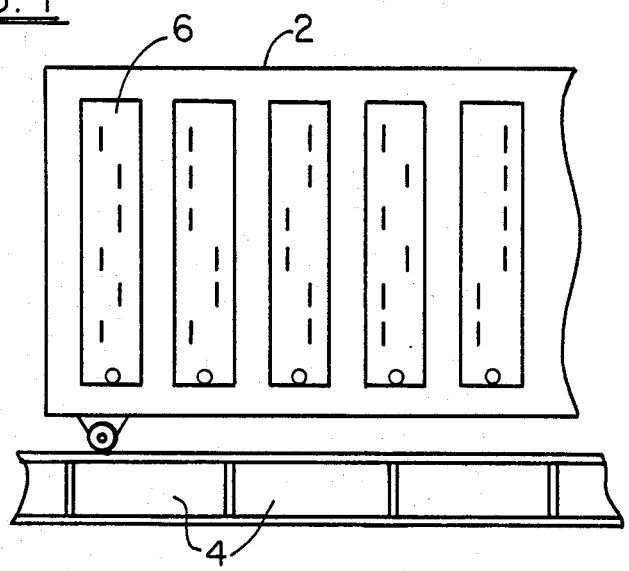
FIG. 1 shows a side view of the conveyor with a bar code display and a set of stationary receptacles.
Figure 2:
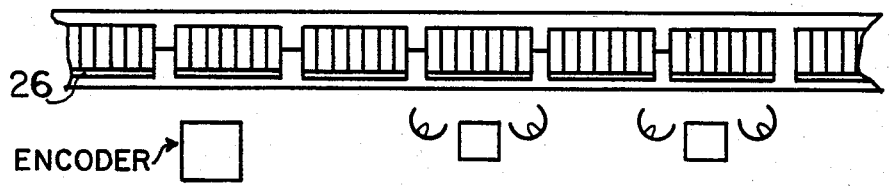
FIG. 2 shows a top view of the general arrangement of a letter sorting conveyor.

FIG. 1 shows part of a conveyor 2 carring a group of letters to be distributed to some of the receptacles 4 to which the letters are destined. Accompanying each letter is a display 6, such as a liquid crystal display, mounted on the side of the conveyor 2, normally in close proximity to the compartment carrying each letter. I prefer to use a binary system and each digit can be coded by energizing one of two bars. Assume that when the right position of each pair is dark this indicates the numeral 1 and when the left bar is dark, it indicates the numeral 0. Thus, the code on the first display 6 shown in FIG. 1 indicates 011010, when read downward.

The energy for the liquid crystal display 6 is obtained from a capacitor 8 shown in FIG. 9. the capacitor 8 is charged by photocells 10 feeding energy through a diode 12 to this capacitor 8. The photocells 10 are illuminated either by the ambient light of the room through which the conveyor passes or by the code illuminating lights 14 (FIG. 5) located near each of the detectors 16 (FIG. 5) or 18 (FIG. 8) as the conveyor 2 moves past them. It should be recognized that the amount of energy required to operate the liquid crystal display is very small and the capacitor 8 (FIG. 9), even if not continually charged by the photocells 10, can operate for many hours. In an ordinary wristwatch, for example, the electronic circuity and the liquid crystal time and date display are operated by a tiny battery for over a year. Liquid crystal devices generally operate on alternating current. I, therefore, provide a circuit 13 for converting the DC from the capacitor 8 (FIG. 9) or the battery 90 (FIG. 10) to AC. The design of such circuits is well known and need not be detailed here. A single capacitor or a single battery can supply the energy for a multiplicity of code display devices.

While I show power supplies that can be charged by non-contact means, a regular replaceable battery can be used. Such a battery would last a long time and may be advantageous for some applications where the enviornment does not encourage the charging of the two types of power supplies I illustrate.

When a letter is dropped into a conveyor 2 by means which are not a part of this invention, a proper code for the letter destination has to be set up in a memory accompanying the letter. This can be done in many ways. For the sake of basic explanation, the simplest is manual control of the sortation. This is still a common practice in many such conveyors in post offices of the world. Assume that a human operator has read the letter and has operated the keyboard 20 shown in FIG. 11. The keyboard 20 can be of the binary type where each key 22 is intended to set one binary bit of the escort memory. Each key 22 would actuate a light-emitting device 24, such as an incandescent bulb, or a light-emitting diode. The light 24 would be focussed on the side panel 26 of the conveyor 2 and would fall on the photocells 28 of the device shown in FIG. 3. These photocells 28, through suitable trigger circuitry 30, would actuate the proper liquid-crystal elements 32 and thus set up the code shown. This describes a simple parallel code setting scheme. The photocell 34 is provided to reset all of the circuits 30 to the "0" condition when desired.

Figure 4:
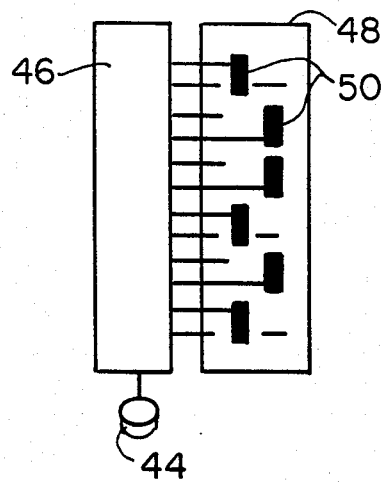
FIG. 4 shows a typical bar code and a single photocell pickup for the code setting circuit.

A more sophisticated arrangement is that of FIGS. 12 and 4. Here the keyboard 36, or a computer output device, feeds a shift register 38 (FIG. 12). The output of the shift register 38 operates a light emitting diode 40 whose light is transmitted by lens 42 to the photocell 44 (FIG. 4) on the escort memory 48. The photocell 44 feeds the signal into the shift register 46 accompanying the escort memory 48 and when the shift register 46 is completely loaded, which can be done in a very short time, the information is fed out in parallel to the bar code 50 resulting in a final bar code such as seen in FIG. 4. The conveyor moves away from the encoding station and eventually reaches a particular detector that will recognize this particular code.

The detector is shown in FIG. 5 consisting of a lens 52 which focuses the image of the entire bar code 60 on a set of optical detectors 54 as shown in FIG. 6 (Taken along line 6—6 of FIG. 5). The optical detectors 54 are connected to a recognition circuit 56 which, in turn, operates the solenoid trip 58 when the code at 60 matches the recognition circuitry 56.

I do not need to describe the recognition circuitry since the technology is well known in the art. The particular technique can be similar to that shown and described in U.S. Pat. No. 4,194,126 issued to me on Mar. 18, 1980. The solenoid 58 then trips a suitable release 62 at the bottom of the conveyor 2 and the letter accompanying this particular bar code is dropped into its intended receptacle. At any suitable point subsequent to the release of the letter, the bar code at 60 can be set at all "zeros" or it can be reset to another code by subsequent proper energizing of the photocell 44 or of the resetting photocell 34 of FIG. 3.

The bar code may be a serial type as shown in FIG. 8 where the bars 64 are vertical but are arranged in a horizontal array illuminated by lamps 67 so that they can be recognized or detected by a single photocell 66 instead of the arrangement shown in FIG. 6. In this case (FIG. 8) a lens 69 forms images of the bars 64 on the photocell 66 as the bars pass this examining station. This is similar to many printed bar codes which are recognized by moving them past a single detector so as to produce a set of pulses sequentially. The nature of the code itself can be quite varied. For example, by using a plurality of bars, the "1" can be represented by energizing two adjacent bars so as to create a single thick bar while the "0" can be represented by a single thin bar.

The art of bar codes is very extensive today and it would serve no purpose to list even a small sample of such codes. The information can be carried by varying the thickness of the bars, or their spacing, or by varying the number of horizontal or vertical arrays, etc.

If it desired to enable the equipment to recognize the escort codes while the conveyor, or other kinds of machines so equipped, happen to be standing still, or moving slowly, or at uncertain rates, a scanning recognition device such as shown in FIG. 7 can be used. Here, a light beam 70, such as from a laser 72, is made to traverse the code carrier 74 or 76 very rapidly by a rotating multi-sided mirror 78. The beam of light 70 can therefore cast a very small spot of light on the code 74 or 76, and this spot would vertically traverse the area of the code carrier very rapidly. The reflected modulated light 80 would be picked up by a single photocell 82 or multiple photocells as in other schemes. Such a flying-spot scanner is frequently used in OCR equipment and, in fact, the bar codes shown in other FIGS. (3, 4 & 7) of this application can be replaced by a code consisting of numerals composed of the 7 elemental bars as is now common in watches, clocks and other liquid-crystal displays, other types of alphanumeric characters or other symbols may be used without departure from the sense of this invention.

Figure 3:
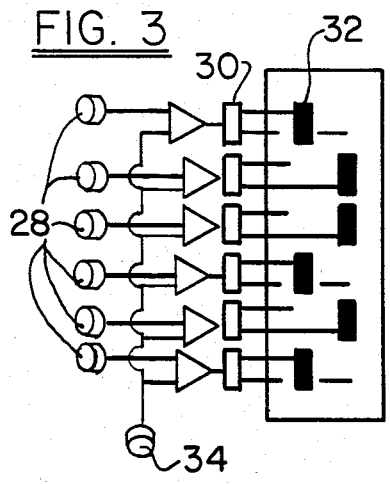
FIG. 3 shows a typical bar code display and the multiple photocell pickup of the code setting circuit.

To prevent errors, various systems of check digits can be employed which are well known in the OCR and computer arts. Checks can be used requiring that the number of bars be always even or always odd. Check numbers can be added to the binary numbers so as not only to provide check digits but actual error-correcting codes, if extreme accuracy is important or desired. It should be recognized that the double bar system of FIGS. 1, 3 & 4 is in itself a very safe system in that two photocells (See FIG. 6) are used for each of the digits. Thus, the system responds not simply to light or dark elements but to the ratio of "0" to "1" light so that simple circuitry can detect the very large difference between the absence or presence of a bar when one photocell of a pair detects much more light then the other. This advantage is also a factor in my U.S. patent cited above.

Automatic slow acting gain controls in the recognition circuitry can be used so that the usual drifts of light intensity, sensitivity of photocells, presence of dust, etc., can be compensated for. One of the advantages of this type of optical codes is the fact that the arrays can be mounted vertically to keep dust and dirt to a minimum, and cleaning equipment can be placed along the conveyor to blow off the dust or, occasionally, even to wash the sides of the conveyor if that should ever become necessary.

It should also be understood that instead of liquid crystal displays light emitting diode displays can also be used. These have the disadvantage that they would require considerably more power for continual operation and would normally require a battery in place of the capacitor in FIG. 9 (FIG. 10). The battery 90 can be charged by photocells 92 in the same manner. The advantage of a light emitting display is that it would not require an outside source of light to be recognized, and may have an advantage in situations where the conveyor belt would have markings or components that could confuse a detector such as used with the liquid crystals.

While the foregoing description of my invention was focused on the application of the easily chargeable code to a sorting conveyor, such as used for letter sorting, it should be recognized that the invention can have many other applications. Such changeable codes can also be applied to carriers of packages, or even applied to pallets or containers that carry objects, as in warehousing applications. Codes of this type can be applied to fixed installations such as shelves or storage bins. They can be specially designed to facilitate automatic warehousing techniques and/or be made human readable as well.

While I concentrated in this specification on the explanation of the use of liquid crystal and light emitting displays, there are other techniques for producing optical images without physical or mechanical contact. There is a wide variety of materials that are classed as electrochromic devices that use organic or inorganic insulating solids which change color when injected with positive or negative charges. Color changes can, of course, be recognized by photocells in the manner similar to those shown above except that by the use of color filters photocells can respond differently to changes of color instead of changes of intensity.

Another type of material that can be used is that which is defined as a photochromic compound. These materials change color when exposed to visible or near-visible radiant energy. The effect is reversible and can be used to produce very high-density microimages. My reasons for concentrating on liquid crystal or light emitting diodes as perferred embodiments of my invention are that such materials are in very widespread use, are inexpensive, require very little energy and the technology is so highly developed.

My invention then, basically, provides a visual code which is easily settable to resettable but which otherwise is very similar to the printed codes widely used at the present time.

I claim:

1. In a sorting device,
   a series of article carrying devices for respectively receiving articles to be sorted,
   a multiplicity of destinations, each of which is represented by a coded signal,
   means for moving said devices past said destinations,
   each article carrying device having means associated therewith for releasing any article stored in the device at a selected destination, comprising:
   (a) a plurality of spaced surfaces, each of which surfaces is carried by and in a fixed and immovable relationship with respect to its complementary article carrying device,
   (b) control means associated with each said surface, and having an electrical input, which in response to a signal on its input changes a characteristic of its complementary surface,
   (c) stationary code imparting means for controlling the input signals to each and every control means associated with a given article carrying device to determine the characteristic of the surfaces associated with said given device, so that the characteristics of said surfaces constitute a coded signaling device,
   (d) said stationary code imparting means and said control means comprising means for changing said characteristics,
   (e) said stationary code imparting means and said control means being in spaced relation to each other and the stationary code imparting means communicating to said control means through the space between them and without physical contact, and
   (f) stationary signal responsive means, associated with each destination, responsive to the codes on the coded signaling devices of the article storage devices for releasing at a given destination any article in any article carrying device whose coded signaling device presents a coded signal representing that given destination.

2. A sorting device as defined in claim 1, in which each of said surfaces comprise means that changes its light reflecting characteristics in response to a signal at the input of its complementary control means, said stationary signal responsive means being responsive to the presence or absence of light reflected from each of the surfaces associated with a given device for releasing at a given destination any article in any article carrying device whose coded signaling device presents a coded signal representing that given destination.

3. A sorting device as defined in claim 2 in which each said surface and its complementary control means comprise a liquid crystal diode.

4. In a sorting device as defined in claim 1, in which each of said surfaces comprise means that changes its light emitting characteristics in response to a signal at the input of its complementary control means, said stationary signal responsive device being responsive to the emitted light from a given article storage device for releasing at a given destination any article in any article carrying device whose coded signaling device presents a coded signal representing that given destination.

5. A sorting device as defined in claim 4 in which each said surface and its complementary control means comprise a light emitting diode.

6. In a sorting device as defined in claim 1, in which each of said surfaces comprise means which changes its color in response to a signal at the input of its complementary control means.

7. In a sorting device as defined in claim 1,
said stationary code imparting means, for each given article carrying device, comprising:
 (a) a keyboard having one key for each control means associated with a given article carrying device,
 (b) a light emitting device for each key and which emits light in response to operation of its complementary key,
 (c) each said light emitting device being complementary to a particular control means, each control means being responsive to its complementary light emitting device to control its complementary surface.

8. The method of delivering an article to a selected destination, comprising:
providing a plurality of destinations each represented by an identifying coded signal,
displaying an identifying coded signal in association with the article for designating the desired destination of the article, comprising:
 (a) establishing control signals at a location remote from the article,
 (b) transmitting said control signals through the air and without physical contact and producing said identifying coded signal from said control signals,
 (c) continuing to display said identifying coded signal until new control signals are transmitted to produce a new identifying coded signal, and
delivering said article to the destination represented by the identifying coded signal associated with said article.

9. The method of claim 8, in which there are a multiplicity of articles each having an identifying coded signal associated therewith, and a multiplicity of destinations each represented by an identifying coded signals.

10. The method of claim 9 in which each of the identifying coded signals associated with an article is one of the identifying coded signals representing one of said destinations.

11. The method of claim 10 in which each of said articles passes by one or more of said destinations until it reaches the particular destination at which the identifying coded siganal associated with the article conforms to the identifying coded signal representing the destination, whereupon the article is automatically delivered to that particular destination.

12. An identifying system for identifying a particular device, comprising:
code displaying means, associated with the device, having a plurality of surfaces,
each of which surfaces is in a fixed and immovable relationship with its associated device,
control means associated with each said surface, and having an electrical input, which in response to a signal on said input changes a characteristic of its complementary surface, and,
stationary code imparting means for controlling the input signals to each and every control means associated with said device to determine the characteristic of the surfaces associated with said device, so that the characteristics of said surfaces constitute a coded signaling system producing coded readable signals,
said stationary code imparting means and said control means being in spaced relation to each other and the stationary code imparting means communicating to said control means through the space between them and without physical contact.

13. An identifying system as defined in claim 12, comprising:
a plurality of said devices each having the following cooperating with each other as defined in claim 12:
 (a) associated surfaces,
 (b) control means, and
 (c) stationary code imparting means,
a plurality of destinations, each represented by coded signals, and,
delivery means responsive to said code display means for delivering any given device to a given destination when the coded readable signal associated with the device conforms to the coded signal of the given destination.

14. An identifying system as defined in claim 13, in which said devices are moved in a path that passes said destinations,
said delivery means including automatic means for reading said coded readable signals and for delivering a device to a given destination when the coded readable signal associated with the device conforms to the coded signal representing the given destination.

* * * * *